Nov. 3, 1925.

J. W. CARNAHAN 1,559,673

WHEEL HUB CONSTRUCTION

Filed July 19, 1922 5 Sheets-Sheet 1

Inventor:
J. W. CARNAHAN,
By W. J. FitzGerald & Co.
Attorney.

Nov. 3, 1925.

J. W. CARNAHAN 1,559,673

WHEEL HUB CONSTRUCTION

Filed July 19, 1922     5 Sheets-Sheet 2

Inventor:
J. W. CARNAHAN,
W. J. FitzGerald & Co.
Attorney.

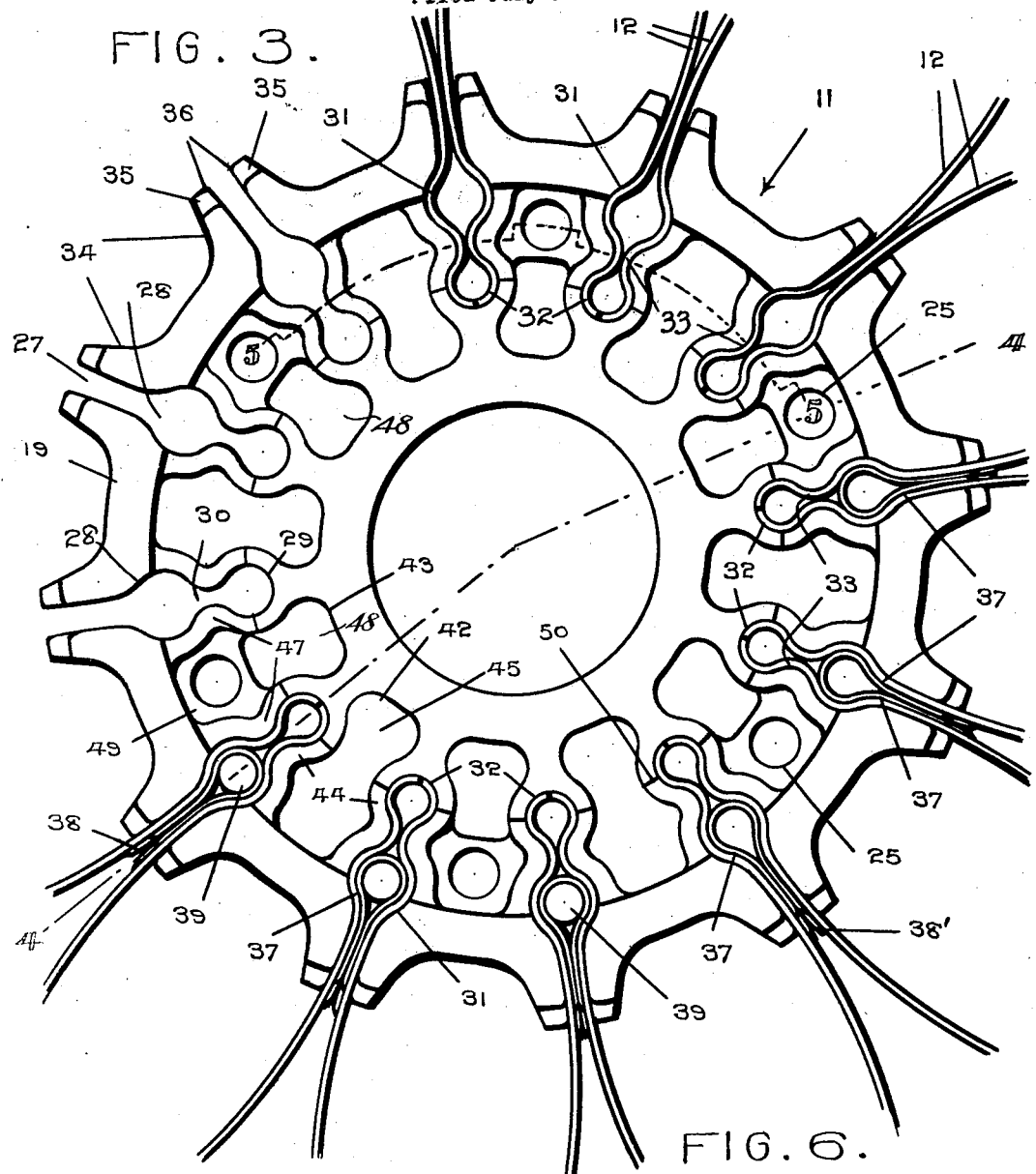
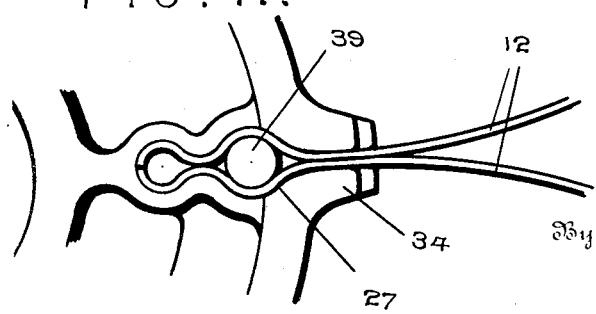
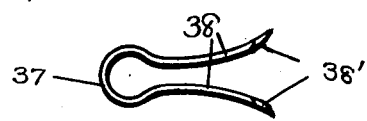

Nov. 3, 1925.
J. W. CARNAHAN
1,559,673
WHEEL HUB CONSTRUCTION
Filed July 19, 1922      5 Sheets-Sheet 4
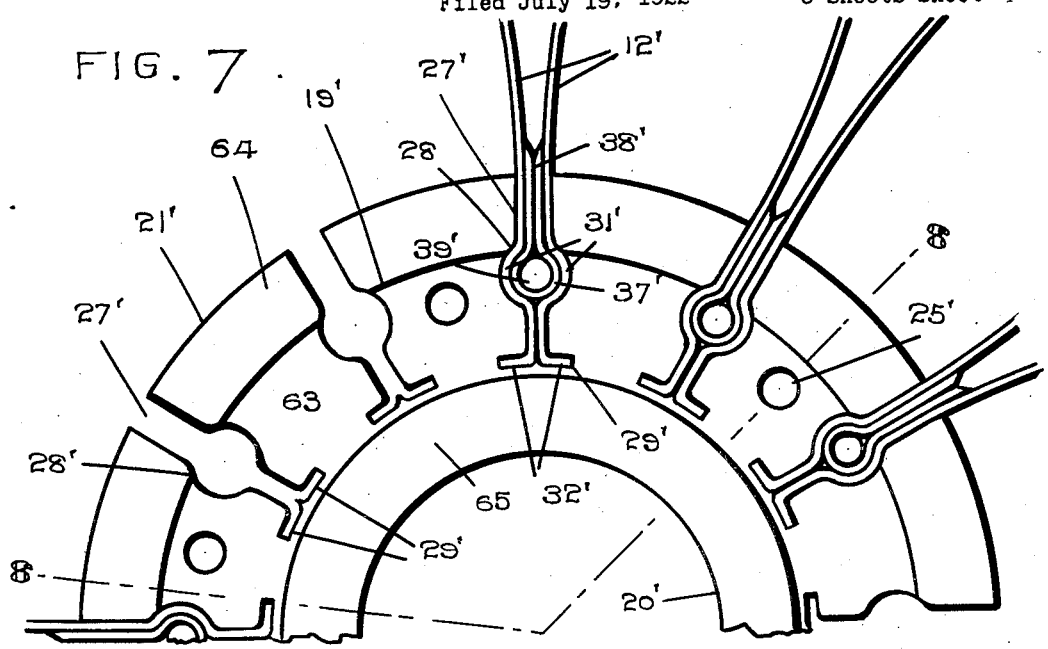
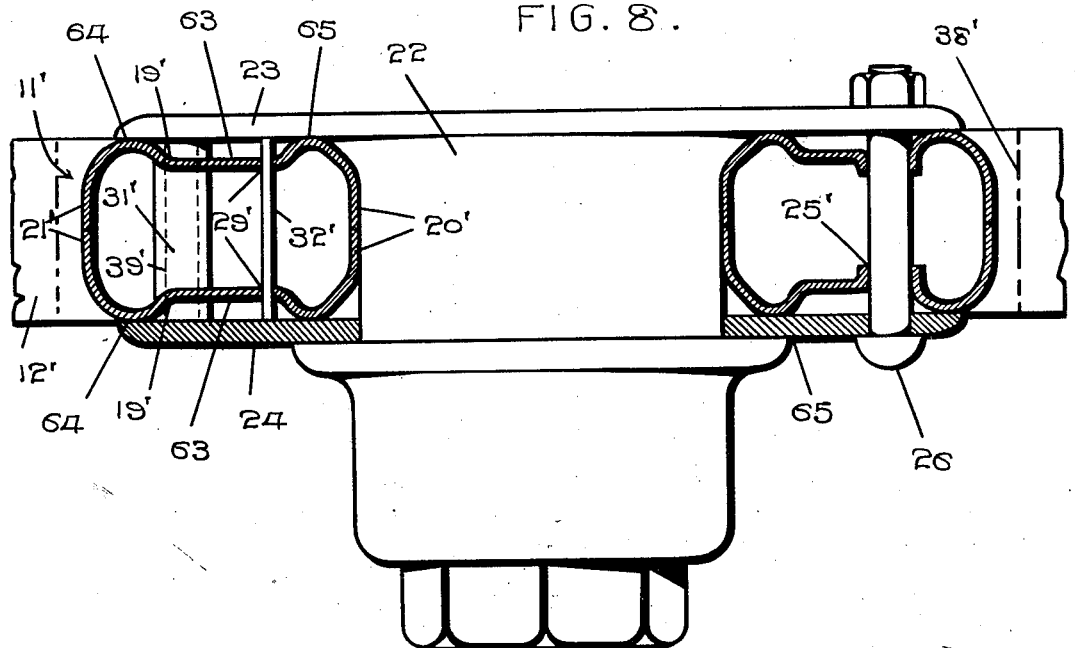
Inventor:
J. W. CARNAHAN,
By W. J. Fitz Gerald & Co.
Attorneys Nov. 3, 1925.

J. W. CARNAHAN

WHEEL HUB CONSTRUCTION

Filed July 19, 1922

Inventor
J. W. CARNAHAN,
By W. J. FitzGerald & Co.
Attorney.

Patented Nov. 3, 1925.

1,559,673

UNITED STATES PATENT OFFICE.

JOHN WORTH CARNAHAN, OF WASHINGTON, DISTRICT OF COLUMBIA, ASSIGNOR TO CARNAHAN INDUSTRIAL ENGINEERING CORPORATION, OF BRIDGEPORT, CONNECTICUT, A CORPORATION OF DELAWARE.

WHEEL-HUB CONSTRUCTION.

Application filed July 19, 1922. Serial No. 575,975.

*To all whom it may concern:*

Be it known that I, JOHN WORTH CARNAHAN, a citizen of the United States, residing at Washington, District of Columbia, have invented certain new and useful Improvements in Wheel-Hub Constructions; and I do hereby declare the following to be a full, clear, and exact description of the invention, such as will enable others skilled in the art to which it appertains to make and use the same.

This invention relates to resilient wheels for automobiles and other vehicles, and this application is a continuation in part of the application Serial No. 371,335, filed April 5, 1920.

An object of the invention is the provision of a novel and improved hub construction in which the spokes are anchored in a thoroughly secure and efficient manner, and the construction being comparatively simple and cheap, and the assemblage of the parts convenient.

Another object is the provision of a hub member of novel construction and formation for receiving and anchoring the spokes therein in an effective manner, and to eliminate the danger of the spokes being crystallized, loosened or torn from the hub member.

A further object is the provision of a hub construction of such a nature that when the spokes are driven or forced home in the hub member, said member and spokes are under strain for tightly gripping the spokes and retaining them in place.

With the foregoing and other objects in view, which will be apparent as the description proceeds, the invention resides in the construction and arrangements of parts, as hereinafter described and claimed, it being understood that changes can be made within the scope of what is claimed, without departing from the spirit of the invention.

The invention is illustrated in the accompanying drawings, wherein:—

Fig. 3 is an enlarged elevation of the hub member, some of the spokes being removed.

Fig. 6 is a detail view of one of the spoke-anchoring keys showing the form thereof before being compressed and inserted into place.

Fig. 7 is a fragmentary elevation of a modified form of hub construction, as shown in the aforesaid application.

Fig. 8 is a section on the line 8—8 of Fig. 7.

Fig. 11 is a detail view of a modification showing the use of a pin without a spring key.

Figure 1:
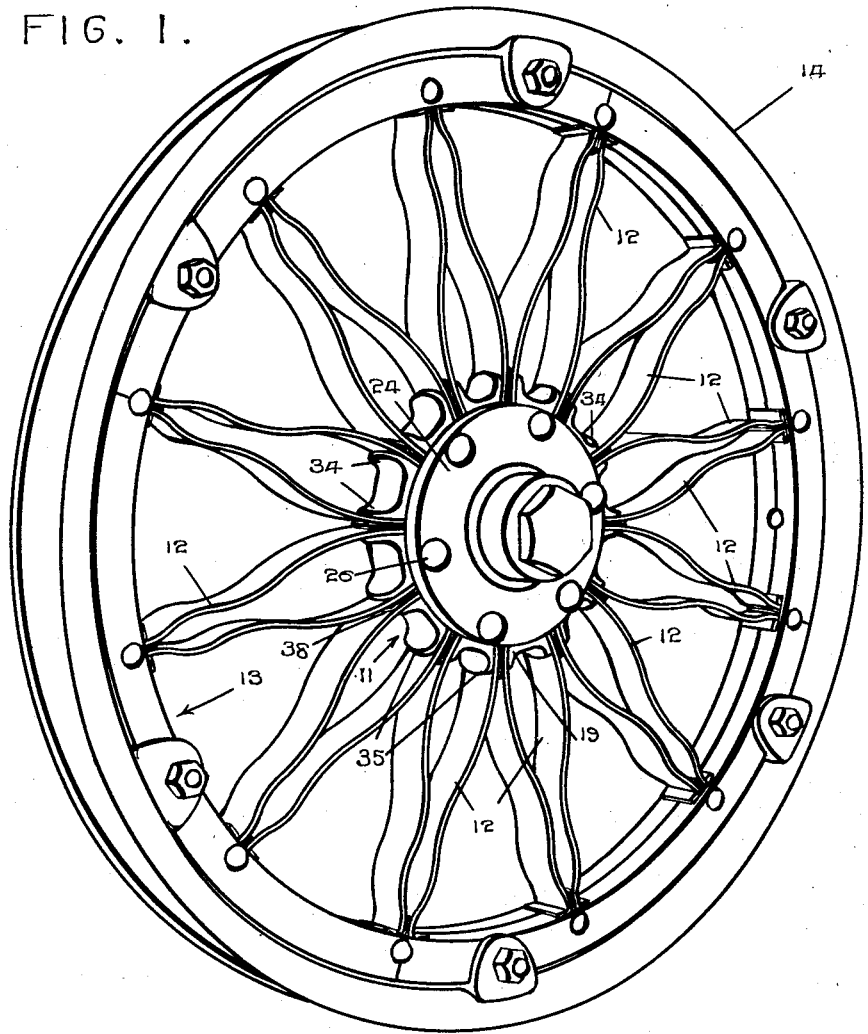
Figure 1 is a perspective view of the complete wheel including a demountable rim.

The wheel comprises a hub construction 11 from which the spokes 12 radiate to the felly 13 on which the rim 14 is disposed. As shown, an ordinary rim is employed for holding a pneumatic tire.

Each spoke consists of a strip of suitable metal, preferably of uniform width and thickness throughout, and composed of hardened steel or other metal of good quality, so as to possess requisite inherent rigidity and resiliency and to ordinarily maintain its shape, yet permit of flexibility under an excessive strain or load.

The hub construction comprises an annular hub member 19, which can conveniently be made by die casting same, and said member is composed of an aluminum alloy or other metal composition which is tough, light in weight and resilient. This hub member is an insert or secondary hub, as shown, of a size to fit on an ordinary wheel hub 22 having the flanges 23 and 24. Thus, the hub member 19 can be applied to an ordinary hub to be held between the flanges 23 and 24, the wooden spokes having been removed from between said flanges, although a special form of hub can replace the ordinary hub 22. However, by the provision of the hub member 19 the same can be applied to an ordinary hub, and hub members 19 of various sizes and proportions can be used for different wheel hubs. The hub member 19 has apertures 25 for the passage of bolts 26 which extend through the flanges 23 and 24, thereby clamping the hub member between said flanges on the main hub 22, and providing for the convenient application of the present structure to and the removal thereof from an ordinary hub, not only for the purpose of installing the present wheel construction on ordinary hubs, but also permitting the wheel to be taken off for repair or replacement.

The inner terminals of the spokes are anchored within the hub member 19, and said member is provided with radial slots 27, extending from side to side, and terminating short of the inner periphery of said hub member. The outer ends of the slots open at the outer periphery of the hub member, and said slots are formed between their ends with the circular enlargements 28 and at their inner ends with the smaller circular enlargements 29. The slots have throats 30 of reduced width between the enlargements 28 and 29, and the side walls of the slots are of sinuous form from their inner ends past the enlargements. The outer end portions of the slots are slightly tapered toward the enlargements 28. The inner terminals of the spokes 12 are fitted in pairs in the slots 27, and the spokes are provided near their inner ends with the separated arcuate portions 31 snugly fitting the opposite walls or seats of the enlargements 28 of the slots. The inner end portions of the spokes of each pair abut and have the separated semi-circular bends or portions 32 fitting snugly in the corresponding enlargement 29. The spokes have thin portions 33 between the separate curved portions 31 and 32, and said portions 33 are curved with their convex sides disposed together to fit in the throats 30.

The hub member 19 is provided at its outer periphery with transverse outstanding lips or flanges 34 at the opposite sides of the slots to bear against the opposite sides of the pairs of spokes, and the outer edges of said lips are curved convexly, as at 35. The edges of the lips 34 which are presented to the spokes are also rounded off, as at 36, so as not to cut, chafe or otherwise injure the spokes in their bending movement adjacent to the hub member. The curved edges 35 of the lips 34 will eliminate the bending of the spokes adjacent to the hub member on definite transverse lines, and the bending of the spokes adjacent to the hub member is thus distributed throughout a short length of the spokes where they emerge from the hub member, to avoid crystallization or breaking of the spokes adjacent to the hub. The metal from which the hub member is formed being softer than the hardened steel spokes, will also eliminate wear on the spokes by any slight movement thereof relatively to the hub member. The spokes are pinched between the lips 34, and said lips are resilient so that when the spokes are driven edge-wise between said lips, the lips are brought under tension to tightly grip the spokes between them.

A spring key is inserted between the pair of spokes in each slot 27 and such key, as shown in Fig. 6, is of thin resilient sheet metal and has the loop 37 and the terminals 38. Said key, before being driven into place, opens up, as seen in Fig. 6, and when the terminals of the key are pressed together, the key is brought under considerable strain, tending to separate said terminals. The spring keys are driven edge-wise between the spokes in the slots 27 with the loops 37 fitted in and between the separated portions 31 of the spokes and the terminals 38 extending outwardly between the spokes beyond the edges of the lips 34. The ends of the keys are curved, as at 38$^a$, similar to the lips 34 in order to avoid the bending of the spokes on transverse lines along the edges of the keys for the same purpose that the lips have curved edges. Said keys thus hold the portions 31 seated in the concaved seats formed by the enlargements 28 of the slots, and the terminals 38 tending to separate will assist in binding the spokes 12 against the lips 34. Anchoring pins 39 may then be driven into the loops 37 of the spring keys for assisting in tightening the spokes in the hub member, although such pins may be dispensed with.

Figure 5:
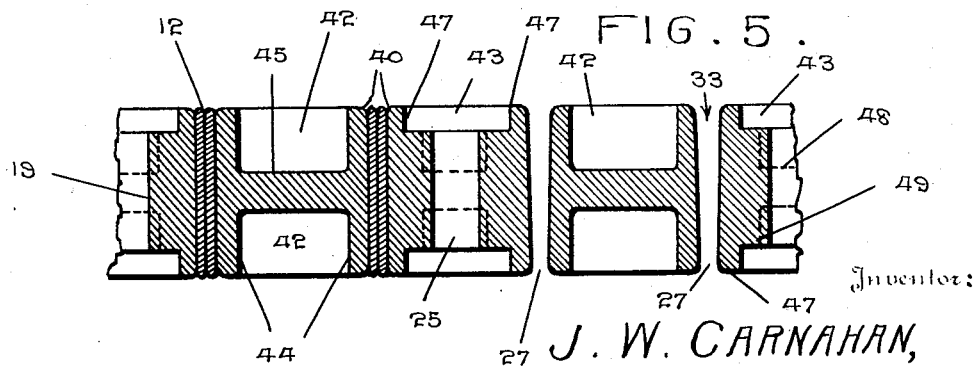
Fig. 5 is a section on the line 5—5 of Fig. 3 showing the hub member mounted on the main hub, portions being shown in plan.
Figure 2:
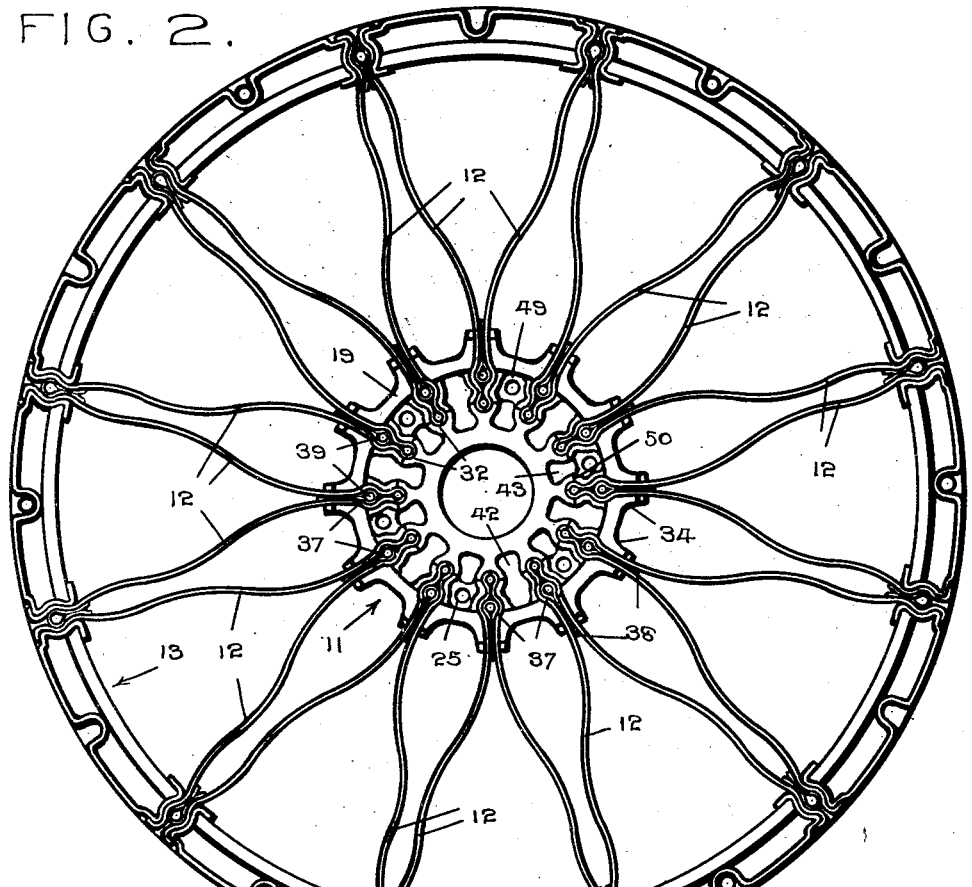
Fig. 2 is a side elevation of the improved wheel, with the rim, felly band, near side felly sections and main hub removed.
Figure 4:
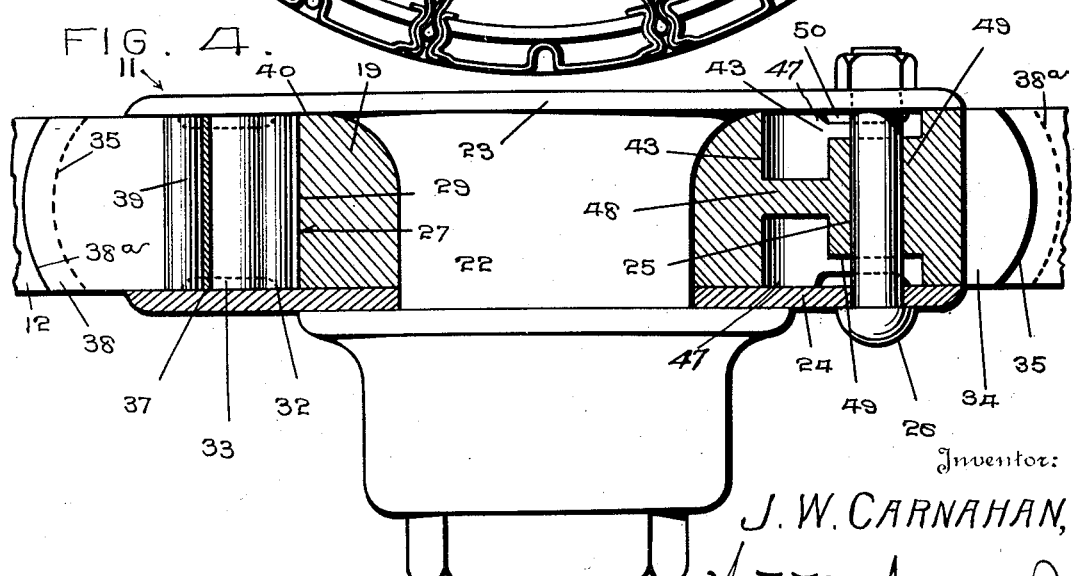
Fig. 4 is a section on the line 4—4 of Fig. 3.

In order that the spokes can be readily driven edge-wise into the slots 27, the edges of said slots at one side of the hub member are rounded off or bevelled, as at 40, to start the edges of the spokes into the slots. The manner of assembling the parts will be described more fully hereinafter, and the slots 27 have a transverse taper, as shown in Fig. 5. Said slots decrease slightly in width from the side of the hub member where the rounded off or bevelled edges 40 are located, and such taper is very slight, although somewhat exaggerated in Fig. 5. Such transverse taper of the slots is just sufficient so that when the spokes are driven into the slots from the wider portions of the slots toward the narrower portions, the spokes will bind in the slots as they are driven into place, and to bring the hub member under tension for tightly gripping the spokes in the slots.

The opposite sides of the hub member are provided with the alternate recesses 42 and 43 between the slots adjacent to the enlargements 28 and 29 thereof, and such recesses also provide for the lightening in weight of the hub member. Said recesses are of a shape to correspond with the curvature of the slots along the enlargements 28 and 29 thereof and the throats 30, and said recesses form the respective flanges 44 and 47 along the opposite sides of the slots. Said flanges extend along the throats 30 of the slots and partially along the enlargements 28 and 29, and the flanges are comparatively thin, so as to be resilient. The opposite recesses 42 have the comparatively thin webs 45 between them, and the bolt apertures 25 are located in the recesses 43. The webs 48 of the hub member between the recesses 43 are also thin at the inner ends of the recesses 43, but the webs 48 are thickened, as at 49, around the apertures 25 at the outer ends of said recesses, to provide sufficient stock for holding the bolts 26, but still providing the flanges 47 along the edges of the slots. The recesses 42 and 43 thus provide the resilient flanges 44 and 47, respectively, extending along the edges of the slots at the portions of the slots where the spokes are anchored, with the webs 45 and 48, respectively, between the flanges rendering the hub member somewhat resilient between the flanges.

The sides of the hub member 19 have the annular grooves or channels 50 between the outer and inner peripheries of said member to enable the spokes and keys to be driven into said member without battering the sides of said member, the hammer or driving implement striking the spokes and keys above the upper groove or channel.

The manner of assembling the parts of the hub construction is as follows: The spokes 12 are inserted in pairs edge-wise in the slots 27, which is facilitated by the rounded off or bevelled edges or corners 40 of the hub member, said hub member being laid down on a table or jig with the edges 40 at the top. The spokes are then driven or forced home into the slots, and when the lower edges of the spokes pass between the lower flanges 44 and 47, said lower flanges, owing to the transverse taper of the slots, are forced apart slightly, thereby springing said lower flanges and causing them to tightly grip the spokes. The separation of the lower flanges 44 and 47 will also spring the webbed portions 45 and 48 of the hub member, so as to have a tendency for springing the upper flanges 44 and 47 toward one another to grip the spokes. The spring keys are then inserted and driven into place. The pins 39 may then be driven into the loops 37 of the keys.

Fig. 11 shows the spokes 12 in the slot 27 of the hub member 19, without the spring key, the outer end portion of the slot being slightly narrower, and the pin 39 being driven directly between the portions 31 of the spokes in contact therewith.

As shown in Figs. 7 and 8, the hub member 11' is of hollow sheet metal construction and comprises the opposite annular side plates 19' having the annular flanges 20' and 21' at their inner and outer edges, respectively, extending at an angle therefrom toward one another with their edges abutting. These two annular sheet metal parts or sections can be readily pressed from sheet metal and the edges of the parts presented to one another in abutment, thereby providing a closed annular hollow hub member of inexpensive construction, which is light in weight and strong. The hub member 11', as shown, can be applied to the ordinary or main wheel hub 22 the same as the hub member 19 hereinbefore described, and the side plates 19' have apertures 25' for the reception of the bolts 26.

The side plates 19' have radial slots 27' terminating short of the inner edges of said plates and extending to the outer edges and through the flanges 21'. The inner terminals of the spokes 12' extend within the slots 27', and the terminals of the spokes have their edge portions disposed in said slots of both hub sections. The inner ends of the slots have T-heads 29' and the inner ends of the spokes are bent at an angle away from one another, as at 32', to fit in said heads of the slots, whereby to anchor and position said terminals of the spokes in the hub. The slots 27' have the enlargements 28' between their ends and the spokes have the curved portions 31' separated from one another and fitted in said enlargements 28'. Spring keys are driven between the spokes and have the loops 37' fitted between the separated portions 31' and the outwardly extending terminals 38' tending to separate for clamping the spokes against the edges of the plates 19' along the slots. Pins 39' may then be driven into the loops of the spring keys for enlarging said loops and clamping the portions 31' of the spokes tightly in the seats formed by the enlargements 28'.

The side plates 19' are provided with the annular side depressions 63 between the flanges 20' and 21', forming the annular ribs 64 and 65 adjacent to the outer and inner flanges, respectively, and said ribs strengthen and stiffen the hub member. Furthermore, the metal of the side plates is offset inwardly from the edges of the spokes 12', in order to better hold the spokes and to provide the grooves or channels in the sides of the hub member to enable the spokes and keys to be driven into the hub member without battering the hub member, it being noted that the edges of the metal of the hub member along the slots 27' are presented to the spokes at points spaced from the edges of the spokes, thus lessening the liability for the edges of the spokes to disengage the side plates of the hub. The outer ribs 64 and flanges 21' are also curved transversely across the outer periphery of the hub, to correspond to the curved edges 35 of the lips 34 of the hub member 19, in order to prevent the concentration of the bending of the spokes on definite transverse lines, and thus avoid the crystallization and breaking of the spokes.

Figure 9:
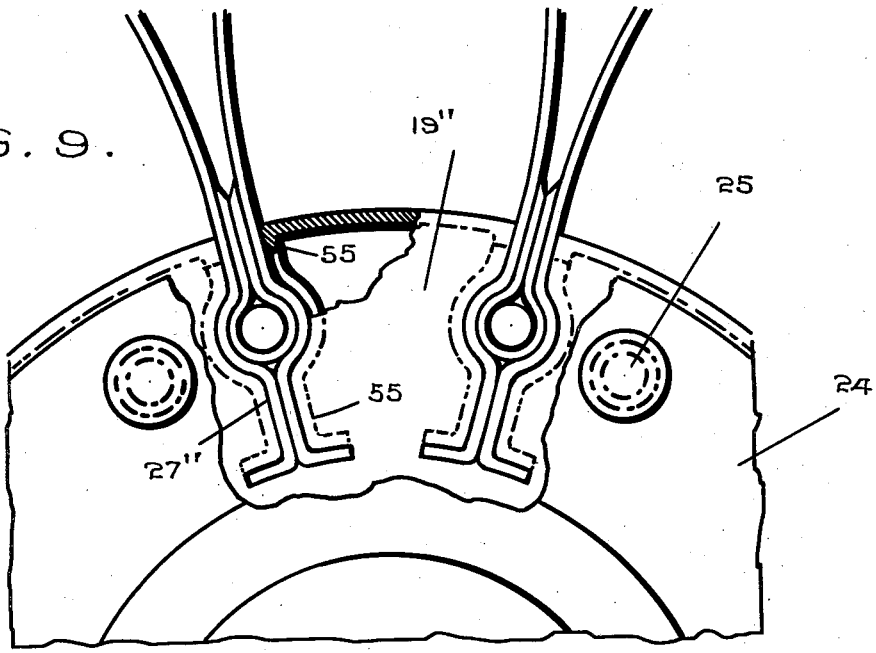
Fig. 9 is a fragmentary elevation of still another form of hub construction, also shown in said application.
Figure 10:
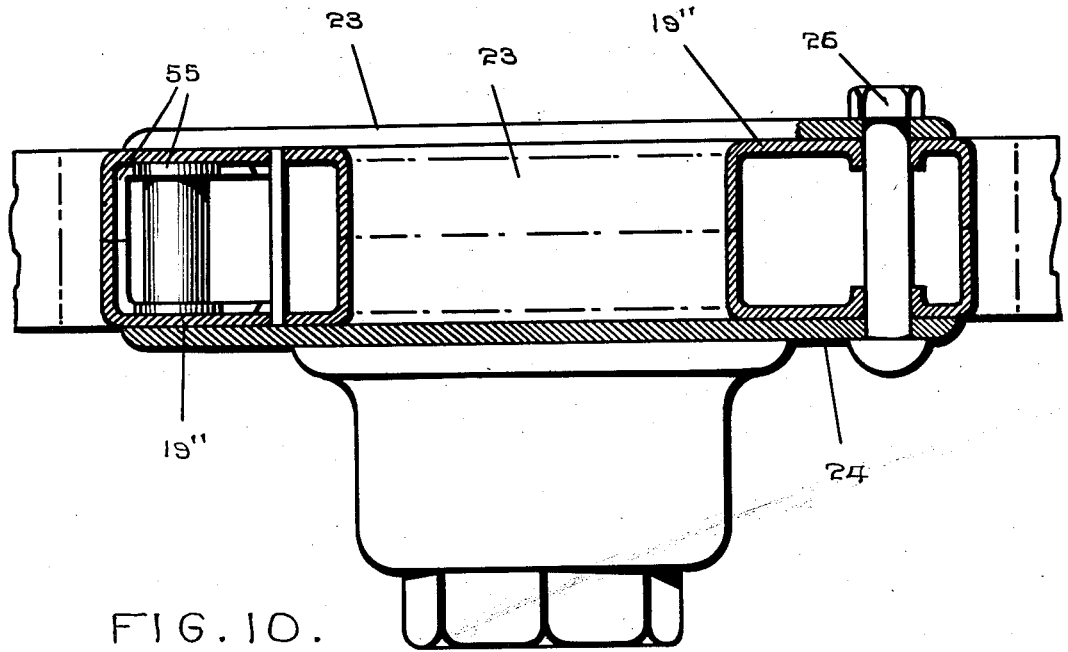
Fig. 10 is a sectional view of the construction shown in Fig. 9, corresponding with Fig. 8.

Figs. 9 and 10 illustrate a hub construction somewhat similar to that shown in Figs. 7 and 8, although the annular side plates 19″ are flat, and the edges of the metal are swaged inwardly along the slots 27″, as at 55, thereby presenting broad bearing surfaces to the spokes, instead of such bearing surfaces being only of a width equal to the thicknesss of the sheet metal. This will increase the bearing surfaces between the hub and spokes to considerably increase the strength of the construction.

Some of the features of the hub construction could also be used in the felly construction by using a felly member of a form corresponding with the hub member.

Having thus described the invention, what is claimed as new is:—

1. A spoke-holding member having spoke-receiving slots and resilient portions along the edges of said slots, and spokes formed from strips driven edge-wise into said slots, said member and spokes having a tapering fit so that said portions are sprung and brought under strain when the spokes are driven into the slots.

2. A spoke-holding member of a wheel having spoke-receiving slots tapering transversely from one side of said member to the other and having resilient portions along the edges of said slots, and spokes formed from strips of even thickness from edge to edge driven edge-wise into said slots and bringing said resilient portions under strain.

3. A solid metal spoke-holding member of a wheel having spoke-receiving slots, and recesses between the slots with resilient flanges along the edges of the slots, and spokes formed from strips driven edge-wise into said slots, said slots and spokes being so formed as to spring said flanges and bring them under strain when the spokes are driven into said slots.

4. A solid metal spoke-holding member of a wheel having spoke-receiving slots, recesses in opposite sides between the slots, resilient flanges along the edges of the slots between the slots and recesses, and webs between the slots and between the opposite recesses, said slots tapering transversely from one side of said member to the other to spring said flanges and bring them under strain when the spokes are driven edge-wise into said slots.

5. A spoke-holding member of a wheel having radial spoke-receiving slots tapering transversely from one side of said member to the other, and said member having resilient portions along said slots to be brought under strain when the spokes are driven edge-wise into the slots.

6. A wheel including a spoke-holding member having radial slots, spokes extending in pairs in said slots, and keys driven between the spokes in said slots and extending out of said slots, the extended portions of said keys having curved edges to distribute the bending of the spokes adjacent to said member.

7. A spoke holding member of a wheel having radial slots for receiving spokes edgewise, said member having an annular channel in one side intersecting said slots for leaving the edges of the spokes exposed, when driven into place in said slots, so as to receive the driving pressure.

In testimony whereof I have signed my name to this specification.

J. WORTH CARNAHAN.